United States Patent [19]

Wong et al.

[11] Patent Number: 5,289,011
[45] Date of Patent: Feb. 22, 1994

[54] SENSOR CONTROL SYSTEM AND METHOD COMPENSATING FOR DEGRADATION OF THE SENSOR AND INDICATING A NECESSITY OF SERVICE PRIOR TO SENSOR FAILURE

[75] Inventors: Lam F. Wong, Fairport; George J. Roller, Penfield, both of N.Y.

[73] Assignee: Xerox Corporation, Stamford, Conn.

[21] Appl. No.: 983,481

[22] Filed: Nov. 30, 1992

[51] Int. Cl.[5] .................................. G01N 21/86
[52] U.S. Cl. ........................ 250/561; 250/214 C
[58] Field of Search ............ 250/226, 561, 214 P, 250/223 R, 214 C; 226/45, 12, 9; 355/41, 67, 203

[56] References Cited

U.S. PATENT DOCUMENTS

| | | | |
|---|---|---|---|
| 3,789,215 | 1/1974 | Penny | 250/206 |
| 4,097,731 | 6/1978 | Krause et al. | 250/205 |
| 4,097,732 | 6/1978 | Krause et al. | 250/205 |
| 4,381,447 | 4/1983 | Horvath et al. | 250/223 R |
| 4,670,647 | 6/1987 | Hubble, III et al. | 250/214 AG |
| 5,021,676 | 6/1991 | Dragon et al. | 250/561 |
| 5,091,654 | 2/1992 | Coy et al. | 250/561 |

*Primary Examiner*—David C. Nelms
*Assistant Examiner*—T. Davenport
*Attorney, Agent, or Firm*—Kenyon & Kenyon

[57] ABSTRACT

A smart sheet sensor control system and method compensating for degradation of an optical sensor. A reference voltage trigger level is periodically adjusted in a manner biased toward a null state indicating an absence of a sheet of paper or document in a paper location. The reference voltage trigger level is periodically adjusted by a microprocessor to always lie within a window range between the null state value and an activated state value indicating a presence of the sheet in the paper location. Since the adjustment is periodic, the microprocessor need not be a dedicated microprocessor and may be used to adjust the reference voltage trigger level corresponding to several sensors respectively sensing the presence or absence of a sheet of paper at several different locations. A service signal may be provided via a copier controller to a display on the copier and/or to a telecommunications device to be forwarded to a vendor service department when the window range between the null state and the activated state is less than a predetermined value so that maintenance may be performed on the sensor prior to a complete failure of the sensor system. The smart sheet sensor control system and method may be implemented in an electrophotographic printing machine sensing sheets of paper or other documents at various locations within the machine.

20 Claims, 6 Drawing Sheets

SENSOR CONTROL SYSTEM AND METHOD COMPENSATING FOR DEGRADATION OF THE SENSOR AND INDICATING A NECESSITY OF SERVICE PRIOR TO SENSOR FAILURE

BACKGROUND OF THE INVENTION

The present invention relates to a sensor control system for compensating for degradation of the sensor system. More particularly, the present invention relates to a smart sheet sensor control system which may be provided in an electrophotographic printing machine and in which a reference voltage trigger level is periodically adjusted to always be within a window between a null state indicating an absence of a sheet in a paper location and an activated state indicating a presence of a sheet in the paper location, the adjustment being made so that the reference voltage trigger level is biased toward the null state.

Optical sensors are often used in applications requiring a determination of the presence or absence of a copy sheet or other document passing through a certain paper location by providing a suitable signal in response to a determination of whether or not the sheet is located in the paper location. The optical sensor typically includes a light source whose light beam is directed at the position in which the document is to be sensed. A light sensitive transducer such as a phototransistor or photodiode is mounted in an aligned relationship with the light source to detect the presence or absence of a sheet in the paper location between the light source and the light sensitive transducer.

A common recurring problem in optical sensor systems placed in reproduction machines is degradation of optical sensors in the paper path due to contaminants such as airborne toner particles, paper fibers, carrier particles, dust buildup, and other contaminants, or aging of the light source, a broken optical sensor, or varying thickness, density, color or smoothness of sheets passing through the paper location. Contaminants generally cause failure of the optical system by coating the optical elements and thereby reducing the illumination level at the sensor. This causes a change in an output voltage level used as a signal which identifies whether or not a sheet is present in the paper location between the light source and the light sensitive transducer.

One solution to this problem is to schedule frequent maintenance to clean the sensor and test the level of performance. However, this is extremely expensive due to increased labor costs and increased down time of the machine.

Various solutions have previously been implemented to overcome the above-discussed sensor degradation problem. U.S. Pat. No. 4,097,731 to Krause et al. issued on Jan. 27, 1978 and U.S. Pat. No. 4,097,732 to Krause et al. issued on Jun. 27, 1978 disclose a sensor including apparatus for regulating the intensity of the sensor light source to compensate for extraneous factors in the operating environment such as dust accumulation, component aging and misalignment. Compensating for these factors by adjusting the power output of the lamp is often complex and expensive. Additionally, this type of compensation provides only a limited degree of adjustment.

U.S. Pat. No. 4,670,647 to Fred F. Hubble, III et al. issued on Jun. 7, 1987 is hereby incorporated into this application by reference. U.S. Pat. No. 4,670,647 discloses a compensation method in which the gain of the received signal is automatically adjusted rather than continually adjusting the power out of the light source. This patent includes a document sensor control circuit which compensates for degradation of the sensor by maintaining an output of an amplifier at a constant level. The output of the amplifier is compared with a reference level and the gain of the amplifier is adjusted if the output of the amplifier falls below the reference level.

U.S. Pat. No. 3,789,215 to Penny issued on Jan. 29, 1974 discloses the detection of documents by establishing analog thresholds against which the analog output of a detector is compared. The range of this type of system may be limited and unreliable, since the threshold is adjusted based on a percentage of a previous peak value detected by the photosensitive detection cell. The apparatus of this patent requires a constant measure and continual update of a sample and hold circuit and a compensation for offsets of an amplifier. Additionally, no indication of a required sensor service is made before the sensor has degraded to a point of failure.

SUMMARY OF THE INVENTION

The sensor control system and sensor control method compensating for degradation in a sensor according to the present invention overcome the problems associated with previous sensor degradation compensation devices.

The sensor control system and method according to the present invention periodically adjust a reference voltage trigger level in a manner biased toward a null-state indicating an absence of the sensed object in an object location. The reference voltage trigger level may be adjusted to always lie within a window between the null state and an activated state which indicates a presence of the sensed object in the object location. Additionally, a service signal is provided indicating that service is required on the sensor system when the window range between the null state and the activated state is marginal, that is when the difference between the voltage levels in the null and activated states is less than a predetermined value. This service signal may be provided so that scheduled maintenance may be performed on the sensor system prior to a complete failure thereof.

Since the sensor control system and method according to the present invention adjust the reference voltage level biased toward the null state, a digital output signal indicating a presence or absence of an object in the object location is more reliable. The null state indicating an absence of the object in the object location is very stable. That is, the voltage level of the null state increases due to degradation of the sensor system at a very slow rate. The voltage level of the activated state, on the other hand, decreases due to sensor degradation at a much higher and varied rate than the rate of increase of the null state. Therefore, since the null state is much more stable than the activated state, reliable results may be obtained when the adjustment of the reference voltage trigger level is biased toward the null state according to the present invention.

The sensor control system and method according to the present invention may be used to control a smart sheet sensor located in an electrophotographic printing machine which senses an absence or presence of a sheet of paper or other document in a paper location.

Additionally, the adjustment of the reference voltage trigger level may be implemented according to the present invention such that the reference voltage level is always within a window range between the null state and the activated state.

A microprocessor may be used to adjust the reference voltage trigger level. Since the reference voltage trigger level need only be adjusted periodically, a non-dedicated microprocessor may be used to make the adjustment periodically and may be used for other purposes when it is not making the reference voltage trigger level adjustment. Furthermore, one microprocessor may be used to adjust the reference voltage trigger level for several different sensors since each reference voltage trigger level is only adjusted periodically.

BRIEF DESCRIPTION OF THE DRAWINGS

Other features and advantages of the present invention will become apparent from the following description taken in conjunction with the attached drawings.

DETAILED DESCRIPTION

Figure 1:
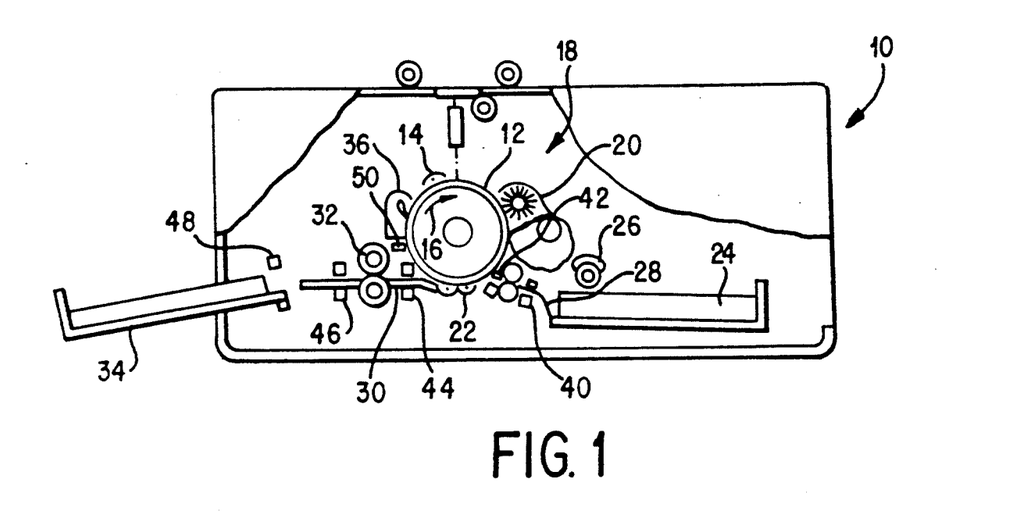
FIG. 1 illustrates an electrophotographic printing machine in which the smart sheet sensor control system according to the present invention may be implemented.

FIG. 1 illustrates an electrophotographic printing machine 10 in which the smart sheet sensor control system according to the present invention may be implemented. The electrophotographic machine 10 includes a photoconductive surface 12 moving in the direction of arrow 16 to sequentially advance the photoconductive surface 12 through various processing stations. A corona generating device 14 provided at a charging station is electrically connected to a high voltage power supply. The corona generating device 14 charges the photoconductive surface 12 to a relatively high, substantially uniform voltage potential.

The charged portion of the photoconductive surface 12 is then advanced through exposure station 18, at which an original document is positioned upon a transparent platen. Lamps illuminate the positioned original document and light rays reflected from the original document are transmitted onto photoconductive surface 12. A magnetic brush development system 20 advances a developer material into contact with the electrostatic latent image.

A sheet of support material 24 is moved into contact with the toner powder image at a transfer station 22. Support material sheet 24 is advanced to transfer station 22 via a sheet feeding apparatus 26 which contacts an uppermost sheet of a stack of sheets of support material 24. Sheet feeding apparatus 26 rotates to advance sheets 24 from the stack to a transport 28. Transport 28 directs the advancing sheet of support material into contact with the photoconductive surface 12 in timed sequence so that the toner powder image developed on the photoconductive surface 12 contacts the advancing sheet of support material 24 at the transfer station 22. Transfer station 22 includes a corona generating device for spraying ions onto the underside of the sheet. This attracts the toner powder image from photoconductive surface 12 to the sheet.

The sheet 24 continues through the transfer station 22 onto prefuser conveyor 30, which advances the sheet to fusing station 32. Fusing station 32 generally includes a heated fuser roller and a back-up roller for permanently affixing the transferred powder image to sheet 24. After fusing, a chute drives the advancing sheet to a catch tray 34 for removal of the sheet by the operator. A cleaning mechanism 36 is used to remove residual toner that may have continued to adhere to photoconductive surface 12.

The electrophotographic printing machine of FIG. 1 also includes five transmissive paper path sensors and one reflective paper path sensor. A first transmissive paper path sensor 40 is positioned at the sheet feed apparatus 26, a second transmissive paper path sensor 42 is provided just prior to transfer station 22, a third transmissive paper path sensor 44 is disposed between transfer station 22 and fusing station 32, a fourth transmissive paper path sensor 46 is positioned after fusing station 32, and a fifth transmissive paper path sensor 48 is provided at the output tray 34. A reflective transmissive paper path sensor 50 is disposed along the photoconductive surface 12 to detect any errant sheet 24 which was not stripped from the photoreceptor drum.

Figure 2:
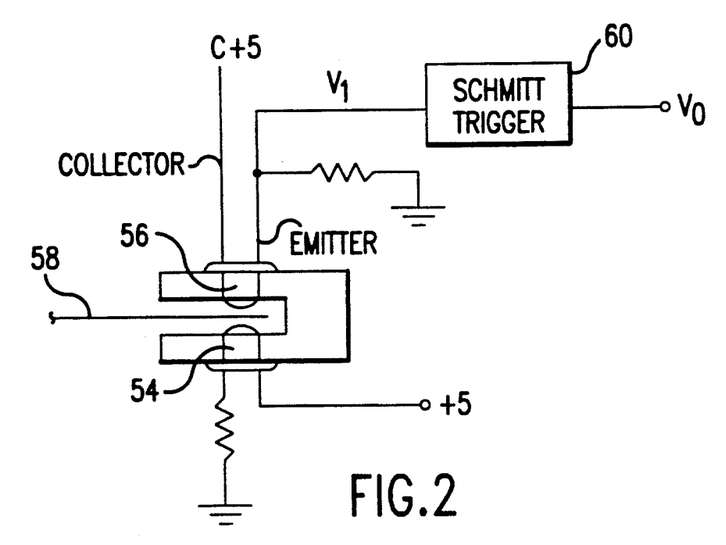
FIG. 2 illustrates a transmissive paper path sensor including a Schmitt trigger used to provide a digital voltage output signal.

FIG. 2 illustrates a typical transmissive paper path sensor such as sensors 40, 42, 44, 46, 48 and 50 illustrated in FIG. 1. A light emitting diode (LED) 54 provides a source of light at a particular paper location. A phototransistor 56 is positioned at a distal end of the station to receive the light projected from the LED 54 if no paper is currently disposed between LED 54 and phototransistor 56. Introduction of a sheet of paper 58 between LED 54 and phototransistor 56 prevents a large portion of the light transmitted from LED 54 from reaching the phototransistor 56.

Light provided from LED 54 and received by phototransistor 56 is converted into an electrical signal $V_1$. Signal $V_1$ is provided as an input to a Schmitt trigger 60 or some other suitable threshold device. An output signal $V_0$ of the Schmitt trigger 60 indicates the presence or absence of paper 58 in the paper location between LED 54 and phototransistor 56 depending on the input voltage signal $V_1$.

Figure 3A:
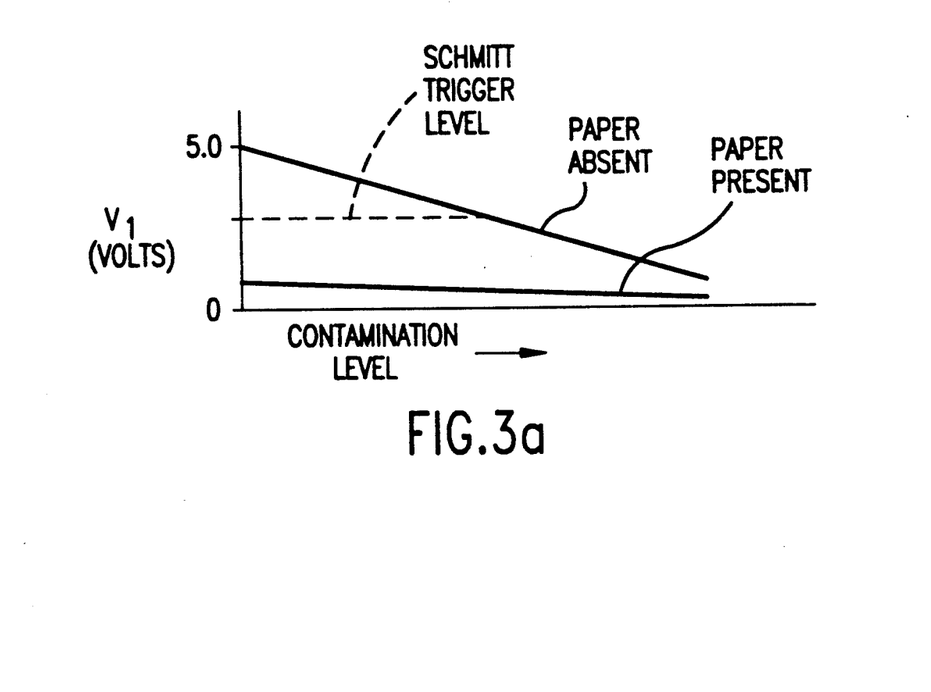
FIG. 3(a) and FIG. 3(b) illustrate the effect of an increased contamination level of the optical surfaces of the sensor illustrated in FIG. 2 on voltages V and Ve.
Figure 3B:
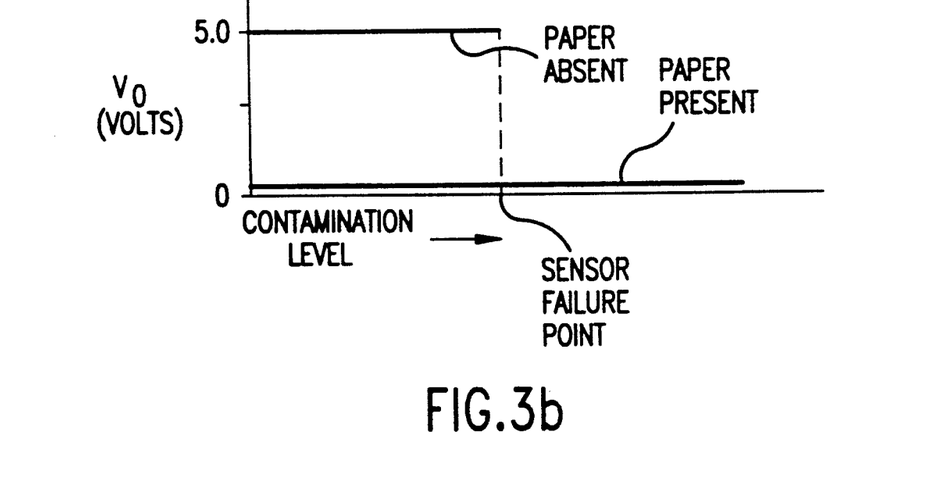

FIG. 3(a) and FIG. 3(b) respectively illustrate the effect of progressive degradation of the sensor system on the voltage output signal $V_1$ and on the voltage output signal $V_o$ illustrated in FIG. 2. The output voltage $V_1$ of the phototransistor 56 is illustrated in FIG. 3(a) relative to an increasing contamination level of the optical surfaces of LED 54 and phototransistor 56. According to the graph illustrated in FIG. 3(a), as the contamination level increases, a relatively small decrease in voltage $V_1$ occurs when paper is present in the paper location between LED 54 and phototransistor 56 and a relatively sharp decrease in voltage $V_1$ occurs when no paper is present in the paper location. The dotted line in FIG. 3(a) represents the Schmitt trigger reference level or input voltage $V_1$ required to provide a change in output voltage $V_0$.

FIG. 3(b) illustrates the relationship of the output voltage $V_0$ of the Schmitt trigger 60 relative to the increasing contamination level represented in FIG. 3(a). An output voltage $V_0$ of 5 volts is provided by the Schmitt trigger 60 when the input voltage $V_1$ is greater then the Schmitt trigger reference level illustrated in FIG. 3(a). An output voltage of 0 volts is provided by Schmitt trigger 60 when the input voltage $V_1$ drops below the Schmitt trigger level at a sensor failure point illustrated by a dotted line in FIG. 3(b). Although no paper is present in the paper location between LED 54 and phototransistor 56, an output voltage signal $V_0$ having a value of 0 volts is output by the Schmitt trigger 60 erroneously indicating that paper is present in the paper location. This erroneous indication occurs because of the decrease in voltage $V_1$ occurring due to the increased contamination level of LED 54 and phototransistor 56.

Figure 4:
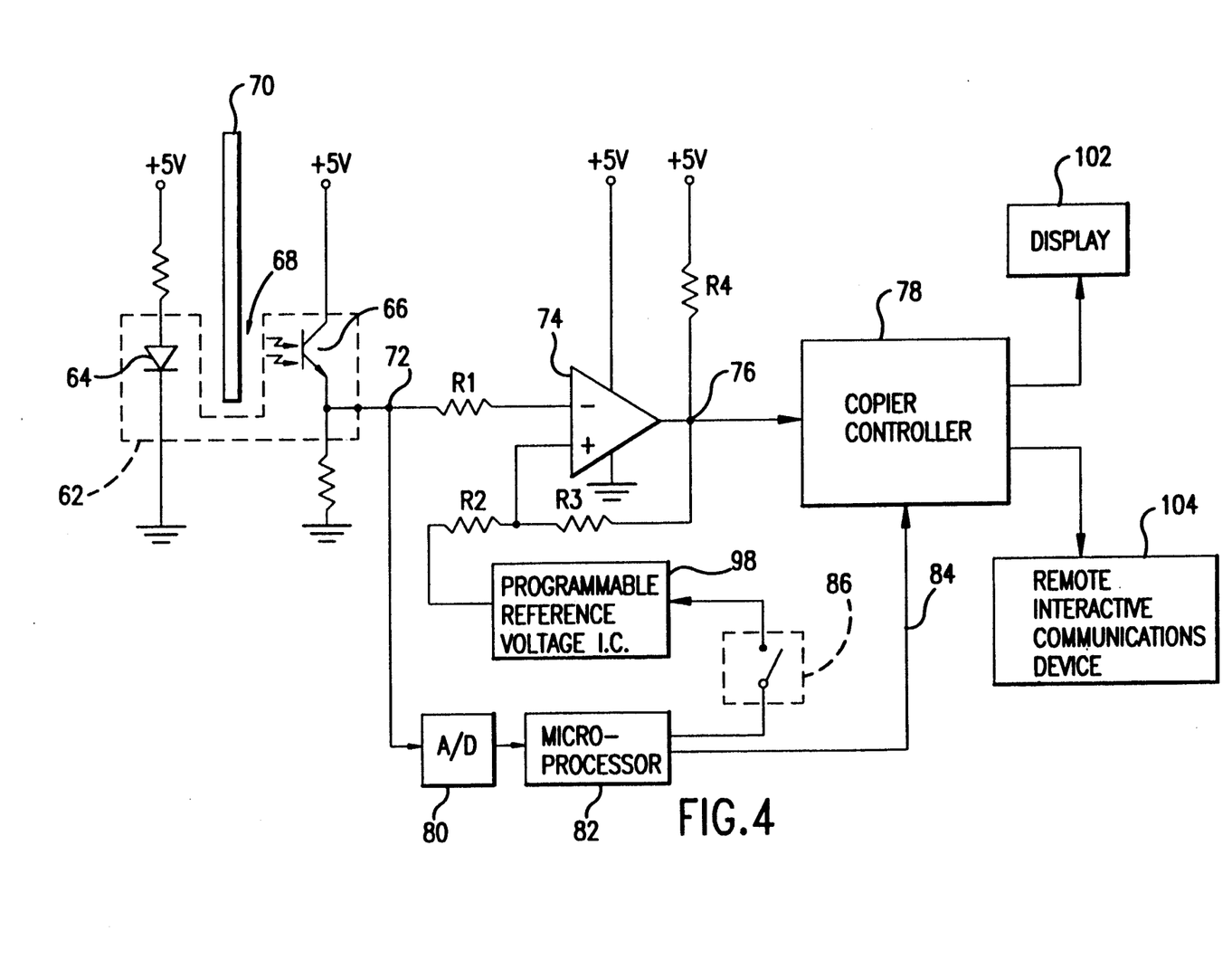
FIG. 4 illustrates a smart sheet sensor control system compensating for degradation of a sheet sensor system and indicating a necessity of sensor service prior to sensor failure according to an embodiment of the present invention.

FIG. 4 illustrates a smart sheet sensor control system compensating for degradation of a sheet sensor system and indicating a necessity of service prior to sensor failure according to an embodiment of the present invention. A u-channel transmissive paper path sensor 62 is indicated in FIG. 4 by a dotted line. U-channel transmissive paper path sensor 62 includes an LED light source 64 and a phototransistor 66. LED light source 64 provides a source of light in a paper location 68 positioned between LED 64 and phototransistor 66. Phototransistor 66 will receive a minimum amount of light if a sheet of paper 70 is in paper location 68 and will receive a maximum amount of light if sheet 70 is not located in paper location 68 between LED 64 and phototransistor 66.

Light provided by LED 64 and received by phototransistor 66 is converted into an analog electrical voltage signal 72. Analog electrical voltage signal 72 has a low value when no sheet 70 or other document is located in paper location 68 and has a high value when a sheet 70 or other document is located in paper location 68. Signal 72 is provided via a resistor R1 preferably having a resistance value of 10 kohms to a first input of a comparator 74. Comparator 74 may be an LM393 comparator. A digital output voltage signal 76 of comparator 74 is provided as a TTL digital signal indicating a presence or absence of a sheet 70 in paper location 68 to a computer such as a copier controller 78.

Signal 7 is provided to analog-to-digital (A/D) converter 80, which converts analog signal 72 to an output digital value which is provided to a microprocessor 82. Microprocessor 82 provides to copier controller 78 an output service signal 84 indicating a necessity of servicing sensor 62. In response to receiving a service signal 84 from microprocessor 82, copier controller 78 provides a signal on a display device 102 to a machine operator and/or provides a service signal to a vendor service department via a remote interactive communications device 104 (e.g., via a telephone line).

A switch 86 which is illustrated symbolically to represent one channel of a multiplexer is provided between microprocessor 82 and a programmable reference voltage integrated circuit memory 88. Memory 88 stores a current reference voltage trigger level. This stored reference voltage trigger level is provided to a second input of comparator 74 via a resistor R2, preferably having a resistance value of 20 kohms. A resistor R3 preferably having a resistance value of 200 kohms is provided between the output and second input of comparator 74. A resistor R4 preferably having a resistance value of 10 kohms is connected between the digital output signal 76 and a 5 volt voltage source.

In the embodiment illustrated in FIG. 4, resistors $R_2$ and $R_3$ have been described as preferably having values of 20 kohms and 200 kohms, respectively. According to the present invention, resistors $R_2$ and $R_3$ are included in a hysteresis circuit of the sensor control system and are set to the above-mentioned values or to other values such that a desired hysteresis level occurs to prevent false triggering.

Figure 5:
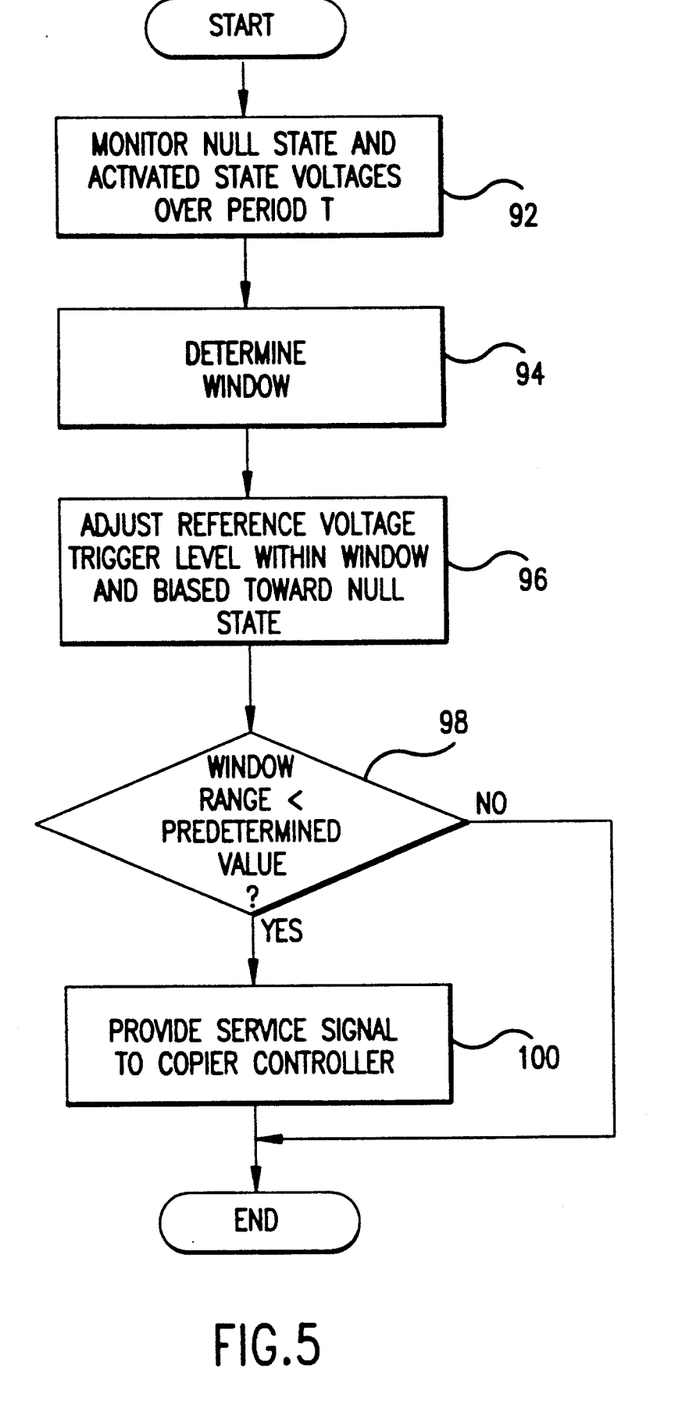
FIG. 5 illustrates a flowchart diagram of program flow of microprocessor 82.

Microprocessor 82 periodically adjusts the reference voltage trigger level stored in programmable reference voltage integrated circuit 88. A flowchart outlining the program flow of microprocessor 82 is illustrated in FIG. 5. Microprocessor 82 first monitors in step 92 the null state and activated state voltage values over a predetermined period of time T. Step 94 determines a window range of voltage values between the null state and activated state. Step 96 adjusts the reference voltage trigger level to fall within the determined window range and to be biased toward the null state, which indicates an absence of the sheet 70 in paper location 68. This adjusted reference voltage trigger level is provided via switch 86 to programmable reference voltage I.C. 88 and stored therein to replace the previously stored reference voltage trigger level. The reference voltage trigger level adjusted by microprocessor 82 and stored in programmable reference voltage I.C. memory 88 is biased toward the null state because the null state is more stable than the activated state, which indicates the presence of a sheet 70 in paper location 68.

A determination as to whether the window range (that is, the difference between the null state and activated state voltage values) is less than a predetermined marginal window value is made in step 98. If the window range is less than the predetermined marginal window value a service signal 84 is provided to the copier controller 78 in step 100. If the window range is not less than the predetermined window value step 100 is bypassed and no service signal is provided to copier controller 78. Service signal 84 indicates that the window range has become too small due to degradation of the u-channel sensor 62 and that a service on the u-channel sensor 62 is necessary.

The updating by microprocessor of the reference voltage trigger level stored in programmable reference voltage I.C. memory 88 and the providing of the service signal 84 to copier controller 78 may be performed on a periodic basis. For example, the updating of the reference voltage trigger level and provision of the service signal 84 may be performed once a day or once a week. In this manner, the microprocessor 82 need not be dedicated only to the sensor control system illustrated in FIG. 4. Microprocessor 82 may be used to perform other tasks unrelated to the sensor control system including copier controller tasks or tasks related to sensor control systems corresponding to other sensors provided within the electrophotographic printing machine.

Figure 6A:
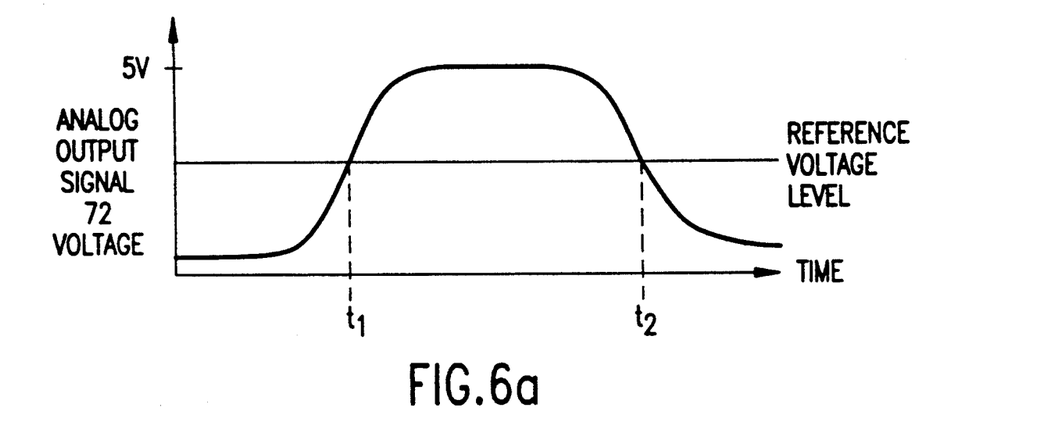
FIG. 6(a) and FIG. 6(b) illustrate the operation of the system illustrated in FIG. 4.
Figure 6B:
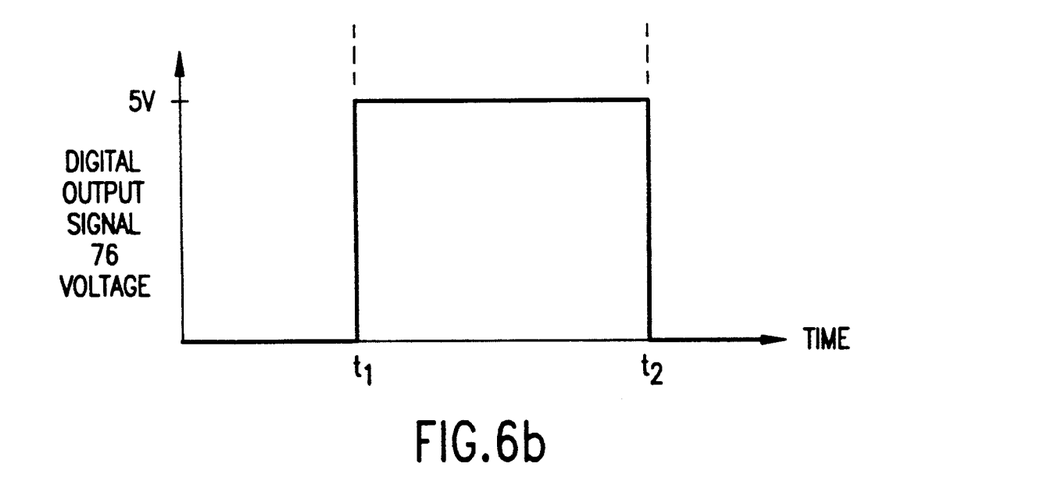

Operation of a portion of the sensor control system according to the embodiment illustrated in FIG. 4 will now be described in reference to the graphs illustrated in FIG. 6(a) and FIG. 6(b). FIG. 6(a) illustrates a possible voltage vs. time graph for the analog voltage signal 72. Analog output signal 72 begins at a low voltage level indicating no sheet 70 positioned in paper location 68 and rises to a higher value indicating entrance of a sheet 70 in the paper looation. When signal 72 rises above the reference voltage trigger level stored in programmable reference voltage I.C. and illustrated in FIG. 6(a) at time $t_1$, the value of digital TTL output signal 76 output by comparator 74 and illustrated in FIG. 6(b) toggles from a low value of 0 volts to a high value of 5 volts, indicating the time at which a sheet 70 enters paper location 68. Similarly, when signal 72 decreases at time $t_2$ below the reference voltage trigger level stored in programmable reference voltage I.C. 88, the value of output digital signal 76 illustrated in FIG. 6(b) returns from a 5 volt value to a 0 volt value, thus indicating the time at which a sheet 70 exits the paper location 68.

While the graph in FIG. 6(a) is generally illustrated as a smooth curve, variations in the voltage vs. time graph may occur at higher voltages due to noise, etc. causing intermittent triggering. As long as this noise does not cause the voltage to penetrate the reference voltage trigger level no false intermittent triggering occurs. However, if the noise level causes the voltage of the analog output signal 72 to drop below the reference voltage trigger level, a false intermittent triggering may occur. In the present invention, however, since the design of the embodiment of FIG. 4 includes a hysteresis circuit including resistors $R_2$ and $R_3$ which is built in even for small penetration of the reference voltage trigger level, the hysteresis circuit would prevent the sensor system from false triggering.

Figure 7:
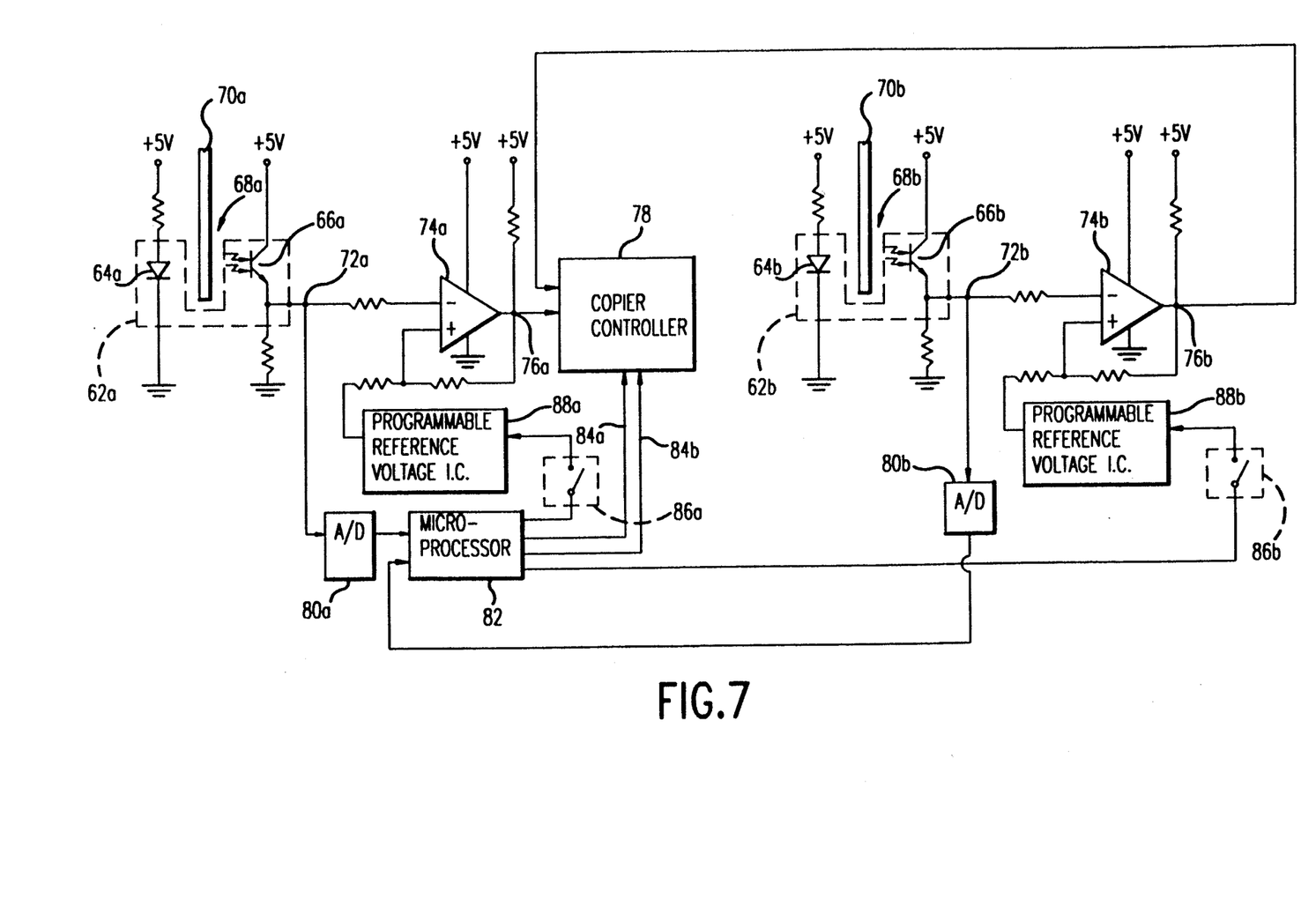
FIG. 7 illustrates a smart sheet sensor control system compensating for degradation of a sheet sensor system and indicating a necessity of sensor service prior to sensor failure in a multiple sensor system according to an embodiment of the present invention.

FIG. 7 illustrates a multiple sensor sheet sensor control system according to an embodiment of the present invention. Reference numerals 62a and 62b indicate u-channel sensors respectively including an LED light source 64a and 64b, a phototransistor 66a and 66b and a paper location 68a and 68b through which a sheet or document 70a and 70b passes. A/D converters 80a and 80b convert analog signals 72a and 72b to digital form and provide these digital signal to a microprocessor 82.

Since microprocessor 82 only periodically adjusts the reference voltage trigger level, one microprocessor 82 may be used to perform the functions related to both of the sensors 62a and 62b. Microprocessor 82 provides service signals 84a and 84b to copier controller 78 which respectively indicate the necessity of service on sensors 62a and 62b, respectively. Alternatively, microprocessor 82 may provide only one service signal to copier controller 78 indicating the necessity for service on one or more of the sensors.

Switches 86a and 86b which are illustrated symbolically to represent two channels of a multiplexer are provided between microprocessor 82 and reference voltage level integrated circuits 88a and 88b, respectively. The reference voltage trigger levels respectively corresponding to sensors 62a and 62b are stored in circuits 88a and 88b.

Comparator 74a compares analog signal 72a with the value stored in programmable reference voltage integrated circuit 88a and provides to copier controller 78 a resulting digital output signal 76a indicating a presence or absence of sheet 70a in paper location 68a. Similarly, comparator 74b compares analog signal 72b with the value stored in programmable reference voltage integrated circuit 88b and provides to copier controller 78 a resulting digital output signal 76b indicating a presence or absence of sheet 70b in paper location 68b.

Embodiments according to the present invention have been illustrated in which one or two sensors may be controlled. However, embodiments of the sensor control system according to the present invention in which more than two sensors are controlled could be implemented within the spirit and scope of the present invention. The number of sensors which could be controlled according to the system and method of the present invention is only limited by the number of channels available to the multiplexer.

While this invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A sensor control system controlling an output of a sensor which detects whether an object is located in an object location, comprising:
    a comparator comparing an analog output signal of said sensor with a reference voltage signal and in response to said comparing providing a digital output signal which indicates a presence or an absence of an object in said object location;
    means for adjusting said reference voltage signal in response to said analog output signal of said sensor, wherein the reference voltage signal is adjusted to have a value within a window ranging between a null state value indicating that an object is not located in said object location and an activated state value indicating that an object is located in said object location, said adjusted reference voltage signal biased toward said null state; and
    means for providing a service signal indicating a requirement for service of the sensor if a difference between said activated state value and said null state value is less than a predetermined value.

2. A sensor control system according to claim 1, further comprising an analog to digital converter converting said analog output signal of said sensor to a digital value provided to said means for adjusting.

3. A sensor control system according to claim 1, wherein said object is a sheet of paper, said sensor senses a presence or absence of said sheet of paper in said object location, and said sensor control system is a smart sheet sensor control system controlling an output of said sensor.

4. A sensor control system according to claim 3, wherein said sensor control system is provided in an electrophotographic printing machine.

5. A sensor control system according to claim 1, wherein said sensor is an optical sensor.

6. A sensor control system according to claim 5, wherein said optical sensor comprises a light source and a light sensitive transducer.

7. A sensor control system according to claim 1, wherein said means for adjusting periodically adjusts said reference voltage signal.

8. A sensor control system according to claim 1, further comprising a display device displaying said service signal to a machine operator.

9. A sensor control system according to claim 1, further comprising a remote interactive communications device providing said service signal to a vendor service department.

10. A sensor control system according to claim 1, wherein said means for adjusting and said means for providing are comprised by a microprocessor.

11. A sensor control system according to claim 1, further comprising a controller receiving said digital output signal and said service signal.

12. A sensor control system according to claim 1, further comprising a hysteresis circuit connected with said comparator to prevent false intermittent triggering of said digital output signal.

13. A sensor control system according to claim 12, wherein said hysteresis circuit includes a plurality of resistors.

14. A sensor control system controlling an output of a plurality of sensors which detects whether an object is located in a corresponding object location near each of said sensors, comprising:

for each of said plurality of sensors:
a comparator comparing an analog output signal of said sensor with a reference voltage signal and in response to said comparing providing a digital output signal which indicates a presence or an absence of an object in said object location;
means for adjusting said reference voltage signal in response to said analog output signal of said sensor, wherein the reference voltage signal is adjusted to have a value within a window ranging between a null state value indicating that an object is not located in said object location and an activated state value indicating that an object is located in said object location, said adjusted reference voltage signal biased toward said null state; and
means for providing a service signal indicating a requirement for service of the sensor if a difference between said activated state value and said null state value is less than a predetermined value;
wherein said means for adjusting and said means for providing for each of said plurality of sensors is comprised by a single microprocessor.

15. A sensor control method of controlling an output of a sensor which detects whether an object is located in an object location, said method comprising the steps of:

comparing an analog output signal of said sensor with a reference voltage signal;
providing in response to said comparing step a digital output signal which indicates a presence or an absence of an object in said object location;
adjusting said reference voltage signal in response to said analog output signal of said sensor, wherein the reference voltage signal is adjusted to have a value within a window ranging between a null state value indicating that an object is not located in said object location and an activated state value indicating that an object is located in said object location, said adjusted reference voltage signal biased toward said null state; and
providing a service signal indicating a requirement for service of the sensor if a difference between said activated state value and said null state value is less than a predetermined value.

16. A sensor control method according to claim 15, wherein said object is a sheet of paper, said sensor senses a presence or absence of said sheet of paper in said object location, and said sensor control method is a smart sheet sensor control method controlling an output of said sensor.

17. A sensor control method according to claim 16, wherein said sensor control method is implemented in an electrophotographic printing machine.

18. A sensor control method according to claim 15, wherein said adjusting step periodically adjusts said reference voltage signal.

19. A sensor control method according to claim 15, further comprising the step of displaying said service signal to a machine operator.

20. A sensor control method according to claim 15, further comprising the step of providing said service signal to a vendor service department via remote telecommunication.

* * * * *

UNITED STATES PATENT AND TRADEMARK OFFICE
CERTIFICATE OF CORRECTION

PATENT NO. : 5,289,011
DATED : February 22, 1994
INVENTOR(S) : Lam F. Wong, et al It is certified that error appears in the above-indentified patent and that said Letters Patent is hereby corrected as shown below:

Column 3, line 28, change "V and Ve" to --$V_1$ and $V_0$--.

Signed and Sealed this

Second Day of August, 1994

Attest:

BRUCE LEHMAN

Attesting Officer     Commissioner of Patents and Trademarks